(12) United States Patent
Hamon et al.

(10) Patent No.: US 11,777,081 B2
(45) Date of Patent: Oct. 3, 2023

(54) MULTILAYER ASSEMBLY

(71) Applicant: SOLVAY SPECIALTY POLYMERS ITALY S.P.A., Bollate (IT)

(72) Inventors: Christine Hamon, Bollate (IT); Libero Damen, Cesate (IT); Julio A. Abusleme, Saronno (IT); Riccardo Pieri, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 684 days.

(21) Appl. No.: 15/999,644

(22) PCT Filed: Feb. 14, 2017

(86) PCT No.: PCT/EP2017/053225
§ 371 (c)(1),
(2) Date: Aug. 20, 2018

(87) PCT Pub. No.: WO2017/140649
PCT Pub. Date: Aug. 24, 2017

(65) Prior Publication Data
US 2021/0210748 A1    Jul. 8, 2021

(30) Foreign Application Priority Data
Feb. 19, 2016 (EP) .................................... 16156507

(51) Int. Cl.
| | | |
|---|---|---|
| *H01M 4/36* | (2006.01) | |
| *H01M 4/08* | (2006.01) | |
| *H01M 4/134* | (2010.01) | |
| *H01M 4/1395* | (2010.01) | |
| *H01M 4/38* | (2006.01) | |
| *H01M 4/62* | (2006.01) | |
| *H01M 6/16* | (2006.01) | |
| *H01M 10/0525* | (2010.01) | |
| *H01M 10/0565* | (2010.01) | |

(52) U.S. Cl.
CPC ............. *H01M 4/366* (2013.01); *H01M 4/08* (2013.01); *H01M 4/134* (2013.01); *H01M 4/1395* (2013.01); *H01M 4/382* (2013.01); *H01M 4/62* (2013.01); *H01M 6/16* (2013.01); *H01M 10/0525* (2013.01); *H01M 10/0565* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 6,537,701 B1 | 3/2003 | Nimon et al. | |
| 2013/0017456 A1* | 1/2013 | Sugimoto | H01M 4/505 429/339 |
| 2014/0120269 A1* | 5/2014 | Abusleme | C08K 5/07 427/532 |
| 2015/0194271 A1 | 7/2015 | Toniolo et al. | |
| 2015/0322187 A1* | 11/2015 | Miele | H01M 10/056 526/247 |

FOREIGN PATENT DOCUMENTS

| | | |
|---|---|---|
| WO | 2011121078 A1 | 10/2011 |
| WO | 2014086906 A1 | 6/2014 |

OTHER PUBLICATIONS

Xu, W. et al., "Lithium metal anodes for rechargeable batteries", Energy & Environmental Science, 2014, vol. 7, pp. 513-537, Macmillan Publishers Limited.
Liang Z. et al., "Polymer Nanofiber-Guided Uniform Lithium Deposition for Battery Electrodes", Nano Lett, 2015, vol. 15, pp. 2910-2916, American Chemical Society.
Umeda G.A. et al, "Protection of lithium metal surfaces using tetraethoxysilane", J. Mater. Chem., 2011, vol. 21, pp. 1593, The Royal Society of Chemistry.
Love C.T. et al., "Observation of Lithium Dendrites at Ambient Temperature", ECS Electrochemistry Letters, 2015, vol. 4, No. 2, pp. A24-A27.
Wu H. et al., "Improving battery safety by early detection of internal shorting with a bifunctional separator", Nat. Commun., 2014, vol. 5, pp. 5193, Macmillan Publishers Limited.

\* cited by examiner

*Primary Examiner* — Daniel S Gatewood
(74) *Attorney, Agent, or Firm* — Osha Bergman Watanabe & Burton LLP

(57) ABSTRACT

The present invention provides a multilayer assembly comprising a metallic layer that is at least partially coated with a hybrid inorganic/organic composition, a method for its preparation and an electrochemical cell comprising said multilayer assembly.

19 Claims, No Drawings

MULTILAYER ASSEMBLY

CROSS-REFERENCE TO RELATED APPLICATION

This application is a U.S. national stage entry under 35 U.S.C. § 371 of International Application No. PCT/EP2017/053225 filed Feb. 14, 2017, which claims priority to European application No. EP 16156507.21 filed Feb. 19, 2016. The entire contents of these applications are explicitly incorporated herein by this reference.

TECHNICAL FIELD

The present invention provides a multilayer assembly comprising a metallic layer that is coated at least on one side with a hybrid inorganic/organic composition, a method for the preparation of said assembly and an electrochemical cell comprising said multilayer assembly.

BACKGROUND ART

Primary (non-rechargeable) batteries containing lithium metal or lithium compounds as an anode are very useful energy storage devices, which may find a variety of applications, including a wide number portable electronics to electrical vehicles.

Lithium (Li) metal would also be an ideal anode material for rechargeable (secondary) batteries due to its excellent electrochemical properties. Unfortunately, uncontrollable dendritic growth and limited Coulombic efficiency during lithium deposition/stripping inherent in rechargeable batteries have prevented the practical applications of Li metal-based rechargeable batteries and related devices over the past 40 years (reference: XU, W., et al. "Lithium metal anodes for rechargeable batteries". *Energy Environ. Sci* 2014, vol. 7, p. 513-537, and references cited therein)

With the emergence of post-Li-ion batteries for a number of applications, ranging from portable electronic devices to electric vehicles, safe and efficient operation of Li metal anodes has become an enabling technology which may determine the fate of energy storage technology for the next generation, including rechargeable Li-air batteries, Li—S batteries, and Li metal batteries which utilize intercalation compounds as cathodes (reference: LIANG, Z., et al. "Polymer Nanofiber-Guided Uniform Lithium Deposition for Battery Electrodes". *Nano Lett* 2015, vol. 15, p. 2910-2916, UMEDA, G. A., et al. Protection of lithium metal surfaces using tetraethoxysilane. *J. Mater. Chem.* 2011, vol. 21, p. 1593, LOVE, C. A., et al. "Observation of Lithium Dendrites at Ambient Temperature". *ECS Electrochemistry Letters.* 2015, vol. 4, no. 2, p. A24-A27.)

The main issues with the use of Li metal anodes in secondary batteries are linked to the growth of lithium dendrites during repeated charge/discharge cycles, which ultimately lead to poor service life and potential internal short circuits.

Uncontrolled lithium dendrite growth results in poor cycling performance and serious safety hazards (ref. WU, H., et al. "Improving battery safety by early detection of internal shorting with a bifunctional separator". *Nat. Commun.* 2014, vol. 5, p. 5193.). Upon electrochemical cycling, lithium ions diffuse toward the defects creating the so-called "hot spots". It is well recognized that Li dendrite growth is accelerated at these hot spots where the current density is locally enhanced dramatically. The resulting tree-like lithium metal dendrite will pierce through the separator and provoke internal short circuits, with risks of overheating, fire and potential explosion of the device.

Lithium dendrite growth can be prevented by adding a polymeric layer on lithium metal. This layer should adhere homogeneously on lithium metal to get homogeneous deposition of lithium and should have also good mechanical properties to resist to dendrite growth, moderate swelling for long lifetime, good ionic conductivity to avoid loss of performance and decrease of lithium concentration at the interface. However, the known coating compositions (e.g. based on vinylidene difluoride polymers) do not suppress dendrite growth to a satisfactory level and lower the overall efficiency of the electrochemical cells.

At present, the demand of durable, reliable and safe rechargeable electrochemical cell based on lithium metal anodes is still unmet.

SUMMARY OF INVENTION

The present invention provides a multilayer assembly comprising:
- a metallic layer (a) consisting substantially of lithium metal, sodium metal, magnesium metal, zinc metal, their alloys with silicon or tin, said metallic layer (a) comprising a first surface and a second surface;
- a coating layer (b), which adheres to at least one of said first surface and second surface of metallic layer (a), wherein (b) comprises a hybrid inorganic/organic composition obtained by reacting:
i. a compound (M) of formula (I)

$$X_{4-m}AY_m \qquad (I)$$

wherein X is a hydrocarbon group, optionally comprising one or more functional groups, m is an integer from 1 to 4, A is an element selected from the group consisting of Si, Ti and Zr, and Y is a hydrolysable group selected from the group consisting of an alkoxy group, an acyloxy group and a hydroxyl group and ii. at least one fluoro co-polymer (F), that comprises recurring units deriving from vinylidene difluoride (VDF) and recurring units deriving from at least a monomer (R1') having at least one group —O—Rx and/or —C(O)O—Rx, wherein each Rx, optionally independently from the others, is a hydrogen group or a $C_1$-$C_5$ hydrocarbon group comprising at least one hydroxyl group, wherein by reaction of the said compound (M) and the said fluoro co-polymer (F), the inorganic residues deriving from polycondensation of compound (M) are at least partially chemically bound to co-polymer (F) via reaction with the groups —O—Rx and/or —C(O)O—Rx of co-polymer (F), and wherein (b) optionally comprises:
iii. an electrolyte salt (ES-1) and/or
iv. an ionic liquid (IL-1).

In an embodiment, the present invention relates to a process for the preparation of a multilayer assembly as defined above, comprising the steps of:
i. providing a metallic layer (a) comprising a first surface and a second surface;
ii. providing a compound (M) of formula (I)

$$X_{4-m}AY_m \qquad (I)$$

wherein X is a hydrocarbon group, optionally comprising one or more functional groups, m is an integer from 1 to 4, A is an element selected from the group consisting of Si, Ti and Zr, and Y is a hydrolysable group selected from the group consisting of an alkoxy group, an acyloxy group and a hydroxyl group;

iii. mixing (M), optionally in mixture with an electrolyte salt (ES-1) and/or with an ionic liquid (IL-1), with a composition (C-1) comprising a liquid medium (L1) and at least one fluoro co-polymer (F), that comprises recurring units deriving from vinylidene difluoride (VDF) and recurring units deriving from at least monomer (R1') having at least one group —O—Rx and/or —C(O)O—Rx, wherein each Rx, optionally independently from the others, is a hydrogen group or a $C_1$-$C_5$ hydrocarbon group comprising at least one hydroxyl group, to obtain a composition (C);
iv coating at least one of the said first surface and second surface of layer (a) with the composition (C) obtained in step iii., so as to obtain a wet coated layer;
v. removing the liquid medium (L1) to obtain a multilayer material, wherein the inorganic residues deriving from compound (M) are bound with the groups deriving from —O—Rx and/or —C(O)O—Rx of co-polymer (F).

The present invention further provides an electrochemical cell comprising the multilayer assembly as defined above.

DESCRIPTION OF EMBODIMENTS

The inventors surprisingly found that the coating of electrodes with a composition as described above lowers or practically suppresses the growth of dendrites in an electrochemical cell assembly, while maintaining very good ionic conductivity. The coating of at least one side of the electrodes, especially in the case of lithium metal electrodes, with said composition provides an electrode with improved properties in terms of ionic conductivity, swelling and resistance against lithium dendrite growth with respect to coating with organic materials, such as vinylidene difluoride (VDF)-based polymers.

Preferably, in the multilayer assembly of the invention layer (a) consists essentially of lithium metal. Advantageously, the lithium metal layer can be laminated on another metal layer (preferably copper) on the side that is not coated with composition (b), to enhance the mechanical resistance of the layer.

In the context of the present invention, the term "consisting essentially of" indicate that a composition or element comprises more than 95% in weight (with respect to the total weight of the composition) of a specific substance (e.g. lithium metal) or consists of such substance, with the proviso that it may include impurities and traces of other substances that are generally or inevitably present in such substance.

Unless otherwise specified, in the context of the present invention the amount of a component in a composition is indicated as the ratio between the weight of the component and the total weight of the composition multiplied by 100 (also: "wt %").

As used herein, the terms "adheres" and "adhesion" indicate that two layers are permanently attached to each other via their surfaces of contact, e.g. classified as 5B to 3B in the cross-cut test according to ASTM D3359, test method B. For the sake of clarity, multilayer compositions wherein an electrode-type layer (a) and a layer as described above for layer (b) are assembled by contacting, e.g. by pressing (a) and (b) together without adhesion between the two layers are outside the context of this invention.

In the context of the present invention, the terms "fluoropolymer hybrid", "inorganic/organic composition" and "sol-gel hybrid" indicate a composition comprising an organic/inorganic network formed by the cross-linking an inorganic residues deriving from compound (M) and the groups deriving from —O—Rx and/or —C(O)O—Rx of co-polymer (F). The sol-gel hybrid of coating layer (b) have the general structural characteristics described in WO 2011/121078 A (SOLVAY SOLEXIS SPA) 31 Mar. 2011.

By the term "multilayer assembly" or "multilayer material" it is hereby intended to denote a material formed of two or more substances in a series of layers that adhere to each other via at least one side.

The thickness of the coating (b) may depend on the intended application and on the specific design of the device wherein the assembly according the invention is to be incorporated. Preferably, the thickness of coating (b) is from 1 to 100 micrometers, preferably 2 to 50 micrometers, more preferably 3 to 40, 4 to 30, 5 to 20 or 7 to 10 micrometers, most preferably from 2 to 5 micrometers.

For the purpose of the present invention, by vinylidene difluoride (VDF) polymer it is intended to denote a polymer that comprises recurring units derived from vinylidene difluoride (also generally indicated as vinylidene fluoride 1,1-difluoroethylene, VDF), i.e. a polymer derived from the polymerization of recurring units including vinylidene difluoride (VDF), which are present in the final polymer in an amount that is not less than 40% in weight over the total weight of the polymer. The terms "fluoro co-polymer" or "co-polymer" indicate generally a co-polymer of VDF, i.e. polymers wherein the units derived from VDF are present and form less than 100% of the total recurring units.

Preferably, co-polymer (F) contains not less than 50 wt %, more preferably not less than 65 wt %, or 70 wt % or 85% of recurring units deriving from VDF.

The co-polymer (F) typically comprises recurring units (R1') derived from at least one (meth)acrylic monomer (MA) having formula (II) here below:

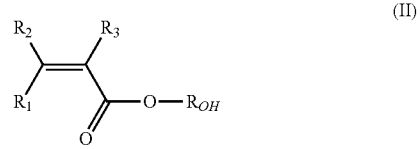

wherein:
$R_1$, $R_2$ and $R_3$, equal to or different from each other, are independently selected from a hydrogen atom and a $C_1$-$C_3$ hydrocarbon group, and
$R_{OH}$ is a hydrogen atom or a $C_1$-$C_5$ hydrocarbon moiety comprising at least one hydroxyl group.

Co-polymer (F) typically comprises at least 0.01 wt %, preferably at least 0.02 wt %, more preferably at least 0.03 wt % of recurring units (R1') derived from at least one (meth)acrylic monomer (MA) having formula (II) as described above.

Co-polymer (F) typically comprises at most 10 wt %, preferably at most 5 wt %, more preferably at most 2 wt % of recurring units (R1') derived from at least one (meth)acrylic monomer (MA) having formula (II) as described above.

The (meth)acrylic monomer (MA) preferably complies with formula (III) here below:

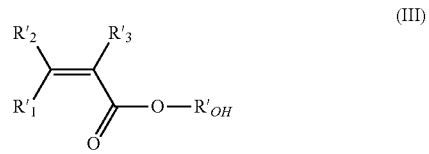

wherein:
R'$_1$, R'$_2$ and R'$_3$ are hydrogen atoms, and
R'$_{OH}$ is a hydrogen atom or a C$_1$-C$_5$ hydrocarbon moiety comprising at least one hydroxyl group.

Non-limitative examples of (meth)acrylic monomers (MA) include, notably, acrylic acid, methacrylic acid, hydroxyethyl(meth)acrylate, hydroxypropyl(meth)acrylate, hydroxyethylhexyl(meth)acrylate.

The (meth)acrylic monomer (MA) is more preferably selected from the followings:
hydroxyethyl acrylate (HEA) of formula:

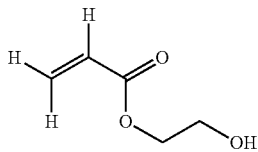

2-hydroxypropyl acrylate (HPA) of either of formulae:

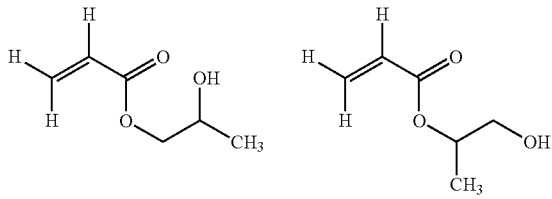

and mixtures thereof.

The (meth)acrylic monomer (MA) is even more preferably hydroxyethyl acrylate (HEA).

The co-polymer (F) preferably comprises at least 0.05 by moles, more preferably at least 0.1% by moles (i.e. in number of moles over the total number of moles of the recurring units in (F)), even more preferably at least 0.2% by moles of recurring units derived from said monomer (MA) having formula (I) as defined above.

The co-polymer (F) preferably comprises at most 10% by moles, more preferably at most 7.5% by moles, even more preferably at most 5% or at most 3% by moles by moles of recurring units derived from said monomer (MA) having formula (I) as defined above.

The inventors have found that best results are obtained when co-polymer (F) is a linear semi-crystalline co-polymer.

The term semi-crystalline is intended to denote a polymer which possesses a detectable melting point. It is generally understood that a semi-crystalline polymer possesses a heat of fusion determined according to ASTM D 3418 of advantageously at least 0.4 J/g, preferably of at least 0.5 J/g, more preferably of at least 1 J/g.

The inventors have found that a substantially random distribution of hydrophilic (meth)acrylic monomer (MA) within the polyvinylidene fluoride backbone of the co-polymer (F) advantageously maximizes the effects of the modifying monomer (MA) on both adhesiveness and/or hydrophilic behaviour of the resulting co-polymer, even at low levels of hydrophilic (meth)acrylic monomer (MA) in the composition, without impairing the other outstanding properties of the vinylidene fluoride polymers, e.g. thermal stability and mechanical properties.

Co-polymer (F) can advantageously be a linear co-polymer, that is to say that it can be composed of macromolecules made of substantially linear sequences of recurring units from VDF monomer and (MA) monomer; co-polymer (F) is thus distinguishable from grafted and/or comb-like polymers.

Co-polymer (F) advantageously possesses improved thermal resistance. In particular, polymer (F) undergoes a loss in weight of 1% wt. in TGA analysis under nitrogen following ISO 11358 standard at a temperature of more than 350° C., preferably of more than 360° C., more preferably of more than 380° C.

Co-polymer (F) may comprise recurring units deriving from at least another monomer (R2'), in addition to those derived from the monomer (R1') as above defined.

Such monomer (R2') can include at least one conventionally used monomer co-polymerizable with vinylidene fluoride, such as, but not limited to, vinyl fluoride, trifluoroethylene, trifluorochloroethylene (CTFE), tetrafluoroethylene (TFE), hexafluoropropylene (HFP), and fluoroalkyl vinyl ether and their mixtures. In any case, it is preferred that the amount of vinylidene fluoride in co-polymer (F) is at least 70 mol %, so as not to impair the excellent properties of vinylidene fluoride resin, such as chemical resistance, weatherability, and heat resistance. The amount of comonomer (R2) is preferably below 10 mol %, more preferably below 5 mol % or below 2 mol % over the total number of moles of recurring units in co-polymer (F). More preferably, co-polymer (F) is a terpolymer formed by recurring units of vinylidene fluoride (VDF), HFP and HEA as defined above.

The composition (C) can optionally comprise at least one other component, in addition to co-polymer (F), and to an electrolyte salt (ES-1), compound (M) of formula (I) as defined above and ionic liquid (IL-1). Preferably, said at least one optional component are selected from an antifoam agent, a surfactant, an anti-bacterial agent, a filler and mixtures thereof. Typically, such optional components, when present, are in an amount lower than 15 wt % over the weight of the composition (C), preferably below 10, 7, 5 or 3 wt %.

In a preferred embodiment, the metallic layer (a) consists of lithium metal or lithium metal alloys, including lithium metal laminated on copper, e.g. on copper foil.

Preferably, the multilayer assembly according to the invention, layer (b) derives from a reaction wherein compound (M) is an alkoxysilane, optionally carrying functional groups on the alkoxy chains, wherein each X group can be the same or different from the other X groups and is a C$_1$-C$_8$ alkyl chain, more preferably wherein (M) is tetramethoxysilane (TMOS), tetraethoxysilane (TEOS), 3-(triethoxysilyl)propylisocyanate (TSPI) or mixtures thereof. Most preferably, the compound (M) is 3-(triethoxysilyl)propylisocyanate (TSPI) or a mixture of TSPI and TEOS.

Preferably, in the multilayer composition of the invention, the molar amount of alkoxysilane carrying functional groups, more preferably TSPI, is from 80% to 120% of the (MA) monomers of co-polymer (F) present in the multilayer composition.

In the context of the present invention, the term "functional groups" indicates chemical moieties different from alkyl chains and aromatic rings, which can be an atom, or a group of atoms that has similar chemical properties whenever it occurs in different compounds, defines the characteristic physical and chemical properties of families of organic compounds (according to the definition of the IUPAC Gold Book 2$^{nd}$ Edition), and which can optionally react to form functionalized or cross-linked species. Non-limiting examples of functional groups are isocyanates, cyanates, cyano groups, esters, amides, carboxylic acids, amines, halides. Preferably, in the multilayer assembly according to the invention, (b) comprises at least one solid inorganic filler selected from an inorganic oxide, preferably $SiO_2$, $TiO_2$, ZnO, $Al_2O_3$ and mixed oxides, an alkaline or alkaline earth metal sulphate, carbonate, sulphide or mixtures thereof.

Preferably, in the multilayer assembly according to the invention, the electrolyte salt (ES-1), when present, is a lithium salt, preferably lithium bistrifluoromethanesulfonimide and/or lithium bis(fluorosulfonyl)imide.

Preferably, in the multilayer assembly according to the invention, the ionic liquid (IL) is selected from those comprising as cation a sulfonium ion or an imidazolium, pyridinium, pyrrolidinium or piperidinium ring, said ring being optionally substituted on the nitrogen atom and comprising as anion those chosen from halides anions, perfluorinated anions and borates, preferably wherein (IL) is Pyr13TFSI (N-propyl-N-methylpyrrolidinium bis(trifluoromethanesulfonyl)imide).

In another embodiment, the present invention provides a process for the preparation of a multilayer assembly as defined above, comprising the step of:

i. providing a metallic layer (a) consisting substantially of lithium metal, sodium metal, magnesium metal, zinc metal, or their alloys with silicon or with tin;

ii. providing a compound (M) of formula (I)

$$X_{4-m}AY_m \quad (I)$$

wherein X is a hydrocarbon group, optionally comprising one or more functional groups, m is an integer from 1 to 4, A is an element selected from the group consisting of Si, Ti and Zr, and Y is a hydrolysable group selected from the group consisting of an alkoxy group, an acyloxy group and a hydroxyl group;

iii. mixing (M), optionally in mixture with an electrolyte salt (ES-1) and/or with an ionic liquid (IL-1), with a composition (C-1) comprising a liquid medium (L1) and at least one fluoro co-polymer (F), that comprises recurring units deriving from vinylidene difluoride (VDF) and recurring units deriving from at least monomer (R1') having at least one group —O—Rx and/or —C(O)O—Rx, wherein each Rx, optionally independently from the others, is a hydrogen group or a $C_1$-$C_5$ hydrocarbon group comprising at least one hydroxyl group, to obtain a composition (C);

iv coating at least one side of layer (a) with the composition (C) obtained in step iii.;

v. removing the liquid medium (L1) to obtain a multilayer material, wherein the inorganic residues deriving from compound (M) are bound with the groups deriving from —O—Rx and/or —C(O)O—Rx of co-polymer (F).

A solvent system is typically used to disperse the polymer binder in the compositions used for coating the metallic layer, which generally comprises a polar aprotic organic solvent or mixtures comprising at least a polar aprotic organic solvent.

Preferably, in the process of the invention the composition (C-1) comprises at least an aprotic organic solvent including, but not limited to, cyclic and linear ethers such as tetrahydrofuran (THF), dimethyl sulfoxide (DMSO), alkylene carbonates such as ethylene or propylene carbonates, alkyl ethers of ethylene glycol or propylene glycol ("glycol ethers" or "glymes"), and mixtures thereof.

Preferably, an electrolyte salt (ES-1) is mixed with the ionic liquid (IL-1) and the compound (M) in step iii to obtain an electrolyte composition (EC-1).

Coating of the metallic layer (a) can be carried out according to any of the methods known to the person skilled in the art, such as casting, doctor blading, die coating, reverse roll coating, gravure coating, spray coating, Mayer bar coating and similar techniques known to the person skilled in the art.

In another embodiment, the multilayer assembly as defined above is used in combination with a porous substrate commonly used for a separator in electrochemical device to provide an assembly of a separator and of the metallic layer (a) coated with layer (b) as described above suitable for use in an electrochemical device, In another embodiment, the invention provides an electrochemical cell comprising the multilayer assembly as defined above.

Preferably, said electrochemical cell is in the form of a rechargeable or primary lithium metal battery.

By the term "electrochemical cell", it is hereby intended to denote an electrochemical assembly comprising a positive electrode, a negative electrode and a liquid, solid or gel-state electrolyte, and a monolayer or multilayer separator placed between said electrodes.

Non-limitative examples of suitable electrochemical devices include, notably, secondary batteries, especially, alkaline or an alkaline-earth secondary batteries such as lithium ion batteries, and capacitors, especially lithium ion-based capacitors and electric double layer capacitors ("supercapacitors").

Should the disclosure of any patents, patent applications, and publications which are incorporated herein by reference conflict with the description of the present application to the extent that it may render a term unclear, the present description shall take precedence.

The following examples are provided to illustrate practical embodiments of the invention, with no intention to limit its scope.

Experimental Part

Raw materials
- Lithium metal foil (Sigma), thickness 0.38 mm, purity 99.9%
- Lithium salt: Lithium bis (trifluoromethanesulfonyl)imide (LiTFSI) (Solvay) purity >99.9%
- Tetraethyl orthosilicate (Sigma) purity ≥99.0%
- Formic acid (Sigma) purity ≥98%
- Ionic liquid N-Propyl-N-Methylpyrrolidinium bis(trifluoromethanesulfonyl) imide (Solvionic®) purity 99.5%
- 3-(Triethoxysilyl)propyl isocyanate (TSPI) (Sigma) purity >94.5%
- Manganese(III) acetylacetonate (Sigma), technical grade
- THF Tetrahydrofuran (Carlo Erba) >99.9%
- DMSO Dimethyl Sulfoxide (Sigma) >99.9%
- DMF N,N-Dimethylformamide (Sigma) >99.8%
- Acetone (Carlo Erba) >99.6%
- LFP ($LiFePO_4$) Life Power® P2 (Phostec), LFP >90%, Carbon 0-4%
- SuperC65 (Imerys) carbon content>99.5 wt. %
- PVDF-HFP-HEA (terpolymer)

General Procedure for Coating Ionobrid or Hybrid PVDF on Lithium Metal

System I: Hybrid PVDF terpolymer (sol-gel)+electrolyte solution

System H: Hybrid PVDF terpolymer (sol-gel) only

Preparation of the F Polymer Solution (5 wt %)

Molecular sieves are placed in THF to remove any trace of water. A PVDF terpolymer PVDF-HFP-HEA (F) is dissolved in THF at 45° C. under reflux. The solution is then cooled to room temperature. Mn(III)AA (catalyst of the linkage reaction of TSPI on PVDF-HEA) is then added and mixed at room temperature (RT) for 10 min. TSPI is added and the solution is heated at 60° C. for 90 min under reflux and then cooled to room temperature (RT).

20 g of PVDF solution contain:

TABLE 1

|  | PVDF | THF | TSPI | Mn(III)AA |
|---|---|---|---|---|
| Weight (g) | 1.0 | 19.00 | 0.043 | 0.006 |

Preparation of the Electrolyte Solution

Electrolyte solution: 0.5 M LiTFSI in PYR13TFSI

The electrolyte solution is prepared in a glass bottle inside a glove box. The PYR13TFSI and LiTFSI are stored in the glove box. The ionic liquid is generally degassed before introducing it in the glove box. Once prepared, the electrolyte solution is stored under ambient atmosphere. The electrolyte solution so obtained has an ionic conductivity of 2.4×10-3 S/cm at 25° C.

Preparation of Systems I and H

The F polymer solution obtained as described above is placed in a bottle inside a glove box. TEOS and (only for System I) electrolyte are added to the solution and mixed for 15 min at RT.

System I

TABLE 2

|  | F polymer Solution | TEOS | ES |
|---|---|---|---|
| weight (g) | 10.782 | 0.490 | 1.000 |

System H

TABLE 3

|  | F polymer solution | TEOS |
|---|---|---|
| Weight (g) | 20.00 | 0.909 |

Casting of the Solutions on Lithium Metal

This third part is prepared in glove box or dry room. The solution is casted on lithium metal, it is dried at room temperature for 10 min and is then heated at 100° C. for 20 min.

EXAMPLES

Example 1: 5-μm ionobrid membrane coated on lithium. System I [75/25]/64 containing 64 vol % electrolyte solution and two silanes TSPI+TEOS. The volume ratio of PVDF to silicon-containing inorganic portion of the inorganic-organic hybrid (obtained from sol-gel reaction) is 75:25.

Example 2: 5-μm hybrid PVDF film coated on lithium. System H [75/25]/0 comprising two silanes TSPI+TEOS (no electrolyte solution). The volume ratio of PVDF to silicon-containing inorganic portion of the inorganic-organic hybrid (obtained from sol-gel reaction) is 75:25.

Comparative Example 1: 5-μm PVDF dense layer coated on lithium. PVDF terpolymer only (no silanes)

Comparative Example 2: No protective layer on lithium metal anode

Measurement of the ionic conductivity (σ)

The self-standing polymeric layer was immersed in Selectilyte™ LP30 electrolyte ethylene carbonate/dimethyl carbonate 1:1 LiPF$_6$ 1 M electrolyte for 24 h. It was then placed in a ½ inch stainless steel Swagelok-cell prototype. The resistance of the polymeric layer was measured and the ionic conductivity (σ) was obtained using the following equation:

$$\sigma = d/(R_b \times S)$$

wherein d is the thickness of the film, $R_b$ the bulk resistance and S is the area of the stainless steel electrode.

Measurement of Lithium Dendrite Growth with a Glass Cell

The purpose of the lithium dendrite test is to discriminate between different polymer lithium coatings in terms of resistance to lithium dendrite formation and penetration. The test was performed in a two-electrode glass cell with polymer coated lithium disc working electrode (diameter 14 mm) and lithium counter electrode (source of lithium); Tonen polypropylene standard Li-ion battery separator (thickness 20 microns) was placed on working electrode and was tightened on the electrode by closing the cell with metal screws; the separator was impregnated with electrolyte ethylene carbonate/dimethyl carbonate 1:1 LiPF$_6$ 1 M. A counter electrode was placed at a distance of about 10 mm. The counter electrode, working electrode and separator were immersed in additional electrolyte ethylene carbonate/dimethyl carbonate 1:1 LiPF$_6$ 1 M, so enabling ionic contact of all cell components. A constant current of −10 mA was applied between the two electrodes causing lithium deposition on working electrode. Since the cell is made of glass the lithium dendrite evolution through the separator can be evaluated by means of visual inspection. The test was stopped when lithium dendrites become visible from the separator surface: longer duration of test is correlated to a more resistant coating.

Lithium Dendrite Growth

The time (in hours) before the dendrite penetration through the separator is visible is reported in Table 1 for different lithium electrodes.

TABLE 4

|  | Example 1 | Example 2 | Comparative Example 1 | Comparative Example 2 |
|---|---|---|---|---|
| Time (h) | 9 | 4.5 | 6 | 3 |

The data in Table 4 demonstrate that in the batteries according to the invention the growth of dendrites is remarkably lower that in batteries comprising a non-coated lithium metal anode.

Coin Cell Testing

Manufacture of the Battery

The battery was composed of protected lithium metal, separator, electrolyte and positive electrode.

The separator was a microporous membrane made of Tonen® type F20BMU. It was dried at 80° C. under vacuum for 18 hours before being used in the battery.

LFP (positive electrode): 82% LiFePO$_4$/10% super C65/8% SOLEF® 5130 PVDF, loading=0.6 mAh/cm². Super C65: carbon powder The positive electrode was dried during one night under vacuum at 130° C.

The electrode and the separator were placed under argon atmosphere (no oxygen, 0% humidity). 150 μL of electrolyte Selectilyte™ LP30 (ethylene carbonate/dimethyl carbonate 1:1 LiPF$_6$ 1 M) was added to the separator.

The membrane was then placed between the positive electrode and the coated lithium metal layer (uncoated in Comp. Ex. 2) in a coin cell and it was tested at room temperature.

TABLE 5

| | Ex. 1 (System I layer) | Ex. 2 (System H layer) | Comp. Ex 1 (PVDF dense layer) | Comp. Ex. 2 (uncoated) |
|---|---|---|---|---|
| IC (S/cm) | $7.7 \cdot 10^{-4}$ | $1.5 \cdot 10^{-5}$ | Film too fragile to be measured | $1 \cdot 10^{-3}$ |

IC = ionic conductivity

Coin Cell Testing (Average Discharge)

TABLE 6

| -Rate (discharge) | Ex. 1 | Ex. 2 | Comp. Ex. 1 | Comp. Ex. 2 |
|---|---|---|---|---|
| 0.05 (D/20) | 165 | 169 | 173 | 168 |
| 0.1 (D/10) | 162 | 162 | 168 | 157 |
| 0.2 (D/5) | 159 | 158 | 163 | 152 |
| 0.5 (D/2) | 153 | 153 | 158 | 149 |
| 1 (D) | 149 | 148 | 153 | 145 |
| 2 (2D) | 144 | 138 | 137 | 142 |
| 5 (5D) | 118 | 105 | 74 | 130 |

The data in Table 6 demonstrate that the performances of the batteries according to the invention are comparable with those of the batteries comprising a non-coated lithium metal anode. At high C-rate, the performances obtained with the invention are significantly better than the anode coated with a PVDF polymer.

The invention claimed is:

1. A multilayer assembly comprising:
a metallic layer (a) consisting essentially of lithium metal or its alloys with silicon or tin, said metallic layer (a) comprising a first surface and a second surface; and
a coating layer (b) which adheres to at least one of said first surface and second surface of metallic layer (a),
wherein a thickness of the coating layer (b) ranges from 2 to less than 5 micrometers,
wherein (b) comprises a hybrid inorganic/organic composition obtained by reacting:
i. a compound (M) of formula (I)

$$X_{4-m}AY_m \quad (I)$$

wherein X is a hydrocarbon group, optionally comprising one or more functional groups, m is an integer from 1 to 4, A is an element selected from the group consisting of Si, Ti and Zr, and Y is a hydrolysable group selected from the group consisting of an alkoxy group, an acyloxy group and a hydroxyl group with
ii. at least one fluoro co-polymer (F), that comprises recurring units derived from vinylidene difluoride (VDF) and recurring units derived from at least a monomer (R1') having at least one group —O—Rx and/or —C(O)O—Rx, wherein each Rx, optionally independently from the others, is a hydrogen group or a $C_1$-$C_5$ hydrocarbon group comprising at least one hydroxyl group,
wherein by reaction of the compound (M) and the fluoro co-polymer (F), inorganic residues derived from polycondensation of compound (M) are at least partially chemically bound to co-polymer (F) via reaction with the groups —O—Rx and/or —C(O)O—Rx of co-polymer (F), and wherein (b) comprises:
electrolyte salt (ES-1); and
an ionic liquid (IL-1);

wherein the multilayer assembly is made by coating at least one of the said first surface and second surface of metallic layer (a) with the hybrid inorganic/organic composition, so as to obtain a coated layer, and
wherein the multilayer assembly exhibits lower lithium dendrite growth than a multilayer assembly having a reference coating layer of the at least one fluoro co-polymer (F) without the compound (M).

2. The multilayer assembly according to claim 1, wherein compound (M) is an alkoxysilane, optionally carrying functional groups on the alkoxy chains.

3. The multilayer assembly according to claim 1, wherein (b) comprises at least one solid inorganic filler selected from an inorganic oxide, an alkaline or alkaline earth metal sulphate, carbonate, sulphide or mixtures thereof.

4. The multilayer assembly according to claim 1 wherein monomer (R1') is a (meth)acrylic monomer of formula (II):

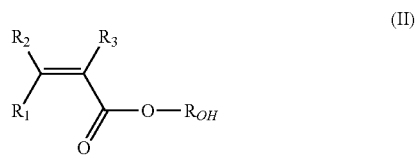

wherein each of $R_1$, $R_2$ and $R_3$, equal to or different from each other, is independently a hydrogen atom or a $C_1$-$C_3$ hydrocarbon group, and Rx is a hydrogen atom or a $C_1$-$C_5$ hydrocarbon moiety comprising at least one hydroxyl group.

5. The multilayer assembly according to claim 1, wherein fluoro co-polymer (F) further comprises at least a monomer (R2') different from (R1').

6. The multilayer assembly according to claim 5, wherein the at least one monomer (R2') in the co-polymer (F) is selected from vinyl fluoride, trifluoroethylene, trifluorochloroethylene, tetrafluoroethylene, hexafluoropropylene, a fluoroalkyl vinyl ether and their mixtures.

7. The multilayer assembly according to claim 1, wherein electrolyte salt (ES-1) is a lithium salt.

8. The multilayer assembly according to claim 1, wherein the ionic liquid (IL) is selected from ionic liquids comprising as cation: a sulfonium ion or an imidazolium, pyridinium, pyrrolidinium or piperidinium ring, said ring being optionally substituted on the nitrogen atom and comprising as anion: a halide anion, a perfluorinated anion or a borates.

9. A process for the preparation of a multilayer assembly according to claim 1, the process comprising:
mixing a compound (M) in mixture with an electrolyte salt (ES-1) and with an ionic liquid (IL-1), with a composition (C-1) comprising a liquid medium (L1) and at least one fluoro co-polymer (F), that comprises recurring units deriving from vinylidene difluoride (VDF) and recurring units deriving from at least monomer (R1') having at least one group —O—Rx and/or C(O)O—Rx, wherein each Rx, optionally independently from the others, is a hydrogen group or a $C_1$-$C_5$ hydrocarbon group comprising at least one hydroxyl group, to obtain a composition (C),
wherein compound (M) is a compound of formula (I)

$$X_{4-m}AY_m \quad (I)$$

wherein X is a hydrocarbon group, optionally comprising one or more functional groups, m is an integer from 1 to 4, A is an element selected from the group consisting of Si, Ti and Zr, and Y is a hydrolysable group selected from the group consisting of an alkoxy group, an acyloxy group and a hydroxyl group;

coating at least one of the said first surface and second surface of layer (a) with composition (C), so as to obtain a wet coated layer;

removing the liquid medium (L1) to obtain a multilayer material, wherein the inorganic residues derived from compound (M) are bound with the groups deriving from —O—Rx and/or —C(O)O—Rx of co-polymer (F).

10. The process of claim 9, wherein composition (C-1) comprises at least an aprotic organic solvent including cyclic and linear ethers, alkylene carbonates, alkyl ethers of ethylene glycol or propylene glycol, and mixtures thereof.

11. The process of claim 10, wherein composition (C-1) is mixed with an electrolyte composition (EC-1) an electrolyte salt (ES-1), an ionic liquid (IL-1) or a mixture of (ES-1) and (ES-2).

12. An electrochemical cell comprising the multilayer assembly of claim 1.

13. The electrochemical cell according to claim 12 in the form of a rechargeable or primary lithium metal battery.

14. The multilayer assembly according to claim 2, wherein the alkoxysilane, optionally carrying functional groups on the alkoxy chains, is selected from tetramethoxysilane (TMOS), tetraethoxysilane (TEOS), 3-(triethoxysilyl)propylisocyanate (TSPI) and mixtures thereof.

15. The multilayer assembly according to claim 3, wherein the inorganic oxide is selected from $SiO_2$, $TiO_2$, ZnO, $Al_2O_3$ and mixed oxides.

16. The multilayer assembly according to claim 7, wherein the electrolyte salt (ES-1) is lithium bistrifluoromethanesulfonimide and/or lithium bis(fluorosulfonyl)imide.

17. The multilayer assembly according to claim 8, wherein the ionic liquid (IL) is N-propyl-N-methylpyrrolidinium bis(trifluoromethanesulfonyl)imide).

18. The process of claim 10, wherein the cyclic and linear ethers comprise tetrahydrofuran (THF), dimethyl sulfoxide (DMSO), or mixtures thereof and wherein the alkylene carbonates comprise ethylene carbonate, propylene carbonate, or mixtures thereof.

19. The electrochemical cell according to claim 12, further comprising a separator.

* * * * *